United States Patent
Chen et al.

(10) Patent No.: US 7,228,253 B2
(45) Date of Patent: Jun. 5, 2007

(54) INSTRUMENT MOUNTING SYSTEM WITH DUAL ENCODERS

(75) Inventors: Jack Chin Chuan Chen, Richmond (CA); Nai Chang Liu, Richmond (CA)

(73) Assignee: Pacific Telescope Corp., Richmond, British Columbia (CA)

( * ) Notice: Subject to any disclaimer, the term of this patent is extended or adjusted under 35 U.S.C. 154(b) by 123 days.

(21) Appl. No.: 10/922,118

(22) Filed: Aug. 19, 2004

(65) Prior Publication Data

US 2006/0052974 A1    Mar. 9, 2006

(51) Int. Cl.
*G01C 9/00* (2006.01)
*G01C 17/00* (2006.01)
*G01C 19/00* (2006.01)
*G06F 15/00* (2006.01)

(52) U.S. Cl. .................. 702/150; 359/429; 359/399; 318/266; 318/625; 318/11; 318/12; 318/15

(58) Field of Classification Search .................. 702/150
See application file for complete search history.

(56) References Cited

U.S. PATENT DOCUMENTS

| | | | |
|---|---|---|---|
| 3,946,298 A | 3/1976 | van de Loo | |
| 5,101,143 A | 3/1992 | Eba | |
| 6,304,376 B1 | 10/2001 | Baun et al. | |
| 6,392,799 B1 | 5/2002 | Baun et al. | |
| 6,492,806 B2 | 12/2002 | Shirai | |
| 6,563,636 B1 * | 5/2003 | Baun et al. | 359/429 |
| 6,600,308 B2 | 7/2003 | Shirai et al. | |
| 6,603,602 B1 | 8/2003 | McWilliams | |
| 2001/0033416 A1 | 10/2001 | Baun et al. | |

OTHER PUBLICATIONS

Celestron 8 ULTIMA 2000 Instruction Manual; Mar. 1998; pp. 1-126; Celestron International, Torrance, California 90503.

* cited by examiner

*Primary Examiner*—John Barlow
*Assistant Examiner*—Sujoy Kundu
(74) *Attorney, Agent, or Firm*—Oyen Wiggs Green & Mutala LLP (57) ABSTRACT

The present invention provides a way to measure the position of an instrument that is mounted on an instrument shaft within a clutched mounting system, the instrument shaft being driven through a reduction gearbox by a motor shaft. The position of the instrument is measured as a function of the position of the motor shaft and the position of the instrument shaft, the measurement of the position of the motor shaft providing greater precision than the position of the instrument shaft. Because the mounting system is clutched, it is necessary to check at intervals whether the measurement of the motor shaft position no longer accurately represents the position of the instrument, in which case the measurement of the motor shaft position is resynchronized to the measurement of the instrument shaft.

47 Claims, 6 Drawing Sheets

INSTRUMENT MOUNTING SYSTEM WITH DUAL ENCODERS

BACKGROUND OF THE INVENTION

1. Field of the Invention

The present invention relates to mounting systems for aiming instruments, for example telescopes. More particularly, the invention relates to computerized mounting systems that permit both motorized and manual aiming.

2. Description of Related Art

Some instruments, such as telescopes, need to be aimed. There are a number of benefits that result from automating this aiming process. For example, an automatically aimed telescope might be programmed to target celestial objects that would be too difficult for a user to find. Furthermore, an automatically aimed telescope might be programmed to track such celestial objects over time, thus enabling time-lapse photography.

Generally, such automated systems are calibrated by first establishing the location of the instrument, for example in terms of latitude and longitude, and then aiming the instrument in a known direction, for example toward a well-known and easy-to-locate celestial object, such as the North Star, Polaris. Once the system has been calibrated, any aiming vector for the instrument may be calculated relative to the calibration coordinates.

To implement a set of axes with respect to which such aiming may be referenced and measured, the instrument is mounted for rotation upon one or more shafts ("instrument shafts") that correspond to each such axis respectively. In the most basic of these systems, each instrument shaft is directly coupled to a motor shaft, which is driven by a motor. This coupling is often implemented through a reduction gearbox to permit the use of a smaller motor. A typical gear reduction is 100:1.

The position of the instrument relative to the calibration coordinates can thus be calculated as a function of the rotation of each instrument shaft. It is well known in the art that such rotation can be measured using shaft encoders, for example optical shaft encoders like those manufactured by US Digital Corporation, 11100 NE 34th Circle, Vancouver, Wash. 98682 USA.

Although it is more direct to measure the rotation of an instrument shaft itself, there is a significant benefit if instead one measures the rotation of the directly coupled motor shaft. Because the motor shaft and the instrument shaft are typically coupled through a reduction gearbox, the motor shaft will rotate many times, for example 100 times, during each rotation of the instrument shaft. Therefore, when an encoder is used to measure rotation of the motor shaft instead of the instrument shaft, the result is a significant increase in precision, typically two orders of magnitude, with any loss in accuracy stemming mainly from whatever backlash might exist in the gearbox.

However, there is a serious shortcoming that results from the direct coupling of an instrument shaft to a motor shaft: the instrument can only be aimed under motor drive. If a user were to apply torque to the instrument shaft in order to manually aim the instrument, that torque would be transferred to the gearbox and the motor and might damage either or both.

One way to overcome this shortcoming has been to insert a normally-engaged clutch between the gearbox and the instrument shaft. When the motor is driven to apply a torque to the motor shaft, that torque is transferred through the gearbox and the clutch to the instrument shaft. However, when a user manually applies a torque to the instrument shaft, the clutch disengages to prevent the torque from acting upon the gearbox, the motor shaft, or the motor.

Although the introduction of this clutch overcomes the restriction against manually aiming the instrument, it does so at a cost. Because the motor shaft is no longer directly coupled to the instrument shaft, the rotation of the motor shaft is no longer an accurate representation of the position of the instrument shaft. In other words, if a user were to manually rotate the instrument shaft, the disengaged clutch would not urge the motor shaft to rotate and so the motor shaft would not rotate in synchronization with the instrument shaft and the instrument.

Conventionally, there have been three solutions to measuring the position of the instrument shaft in clutched systems. First, the encoder has been connected to measure the rotation of the instrument shaft, thereby assuring accuracy but surrendering precision, typically by two orders of magnitude. Second, the encoder has been replaced by a much more precise, and hence much more expensive encoder, which has been connected to measure the rotation of the instrument shaft, ensuring accuracy, precision, and expense. Third, the encoder has been connected to measure the rotation of the motor shaft, ensuring precision; however, to salvage accuracy, the instrument system has had to be recalibrated any time that a torque has been manually applied to the instrument shaft. Clearly, all of these solutions have shortcomings.

Accordingly, what is needed is a better way to measure the position of the instrument in a clutched system: a way that takes advantage of both the precision of motor shaft measurement and the accuracy of instrument shaft measurement.

SUMMARY OF THE INVENTION

The present invention is directed to this need.

According to one aspect of the present invention, there is provided an apparatus for measuring the position of an instrument, the apparatus comprising: a motor shaft adapted to receive torque from a motor; an instrument shaft adapted to mount the instrument for rotation; a linkage between the motor shaft and the instrument shaft, the linkage having alternative first and second operating modes, such that in the first operating mode, the instrument shaft is engaged with the motor shaft to rotate upon the urging of torque received from the motor shaft; and in the second operating mode, the instrument shaft is disengaged from the motor shaft and to rotate independently of the motor shaft; a motor shaft position detector ("MSP detector") to generate a motor shaft position signal ("MSP signal") responsive to the position of the motor shaft; an instrument shaft position detector ("ISP detector") to generate an instrument shaft position signal ("ISP signal") responsive to the position of the instrument shaft; and a controller coupled to receive the MSP signal from the MSP detector and to receive the ISP signal from the ISP detector and to measure the position of the instrument as a function of the MSP signal and the ISP signal.

The linkage may further comprise a clutch coupled between the instrument shaft and the motor shaft.

In one implementation, the MSP detector is synchronized to the ISP detector. For example, the MSP detector may be synchronized to the ISP detector in response to the ISP signal. The MSP detector may be synchronized to the ISP detector when the position of the instrument as a function of just the MSP signal differs from the position of the instrument as a function of just the ISP signal, such as differing by more than a threshold maximum error value. The threshold maximum error value might for example be equal to the absolute value of the maximum measured difference between the MSP signal and the ISP signal.

In one implementation, the function of the MSP signal and the ISP signal that measures the position of the instrument is defined as: if the MSP signal is in synchronization with the ISP signal, then the result of the function is the value represented by the MSP signal; else, the result of the function is the value represented by the ISP signal.

In one implementation, when the MSP signal is in synchronization with the ISP signal, then the MSP signal represents the position of the instrument more precisely than the ISP signal represents the position of the instrument.

In one implementation, the controller synchronizes the MSP detector. The MSP detector might comprise: a shaft encoder to generate a directional motor shaft rotation signal responsive to rotation of the motor shaft through a predetermined angle and an up-down counter coupled to the shaft encoder to receive motor shaft rotation signals and to tally the motor shaft rotation signals into the MSP signal. The up-down counter might be a loadable counter, such that the controller synchronizes the MSP detector by loading a synchronizing value into the up-down counter to replace the existing MSP signal. The synchronizing value might be a function of the ISP signal.

In one implementation, the linkage comprises a gearbox coupled between the motor shaft and the clutch and having a gear ratio, such that the function of the ISP signal used as a synchronizing value would be the product of the value represented by the ISP signal multiplied by the gear ratio.

In one implementation, there is also included a user interface coupled to the controller so as to receive information about the position of the instrument and to present information about the position of the instrument. There might also be included a motor adapted to apply torque to the motor shaft and to apply such torque in response to a drive signal generated by the controller. The controller might generate the drive signal in response to information received from the user interface and the result of the function of the MSP signal and the ISP signal that represents the position of the instrument.

According to another aspect of the present invention, there is provided a method for measuring the position of an instrument, comprising: mounting the instrument on an instrument shaft for rotation thereabout; linking the instrument shaft to a motor shaft adapted to receive torque from a motor, such that in a first operating mode, the instrument shaft is engaged with the motor shaft to rotate upon the urging of torque received from the motor shaft and in a second operating mode, the instrument shaft is disengaged from the motor shaft to rotate independently of the motor shaft; generating a motor shaft position signal ("MSP signal") responsive to the position of the motor shaft; generating an instrument shaft position signal ("ISP signal") responsive to the position of the instrument shaft; and measuring the position of the instrument as a function of the MSP signal and the ISP signal.

In one implementation, linking includes coupling a clutch between the instrument shaft and the motor shaft.

In one implementation, the method further includes synchronizing the MSP signal to the ISP signal. The synchronizing might be performed in response to the ISP signal, for example when the value represented by the MSP signal differs from the value represented by the ISP signal, for example differing from the value represented by the ISP signal by more than a threshold maximum error value. The threshold maximum error value might be equal to the absolute value of a historical maximum difference between the MSP signal and the ISP signal.

In one implementation, the function of the MSP signal and the ISP signal that measures the position of the instrument is defined as: if the MSP signal is in synchronization with the ISP signal, then the result of the function is the value represented by the MSP signal; else, the result of the function is the value represented by the ISP signal.

In one implementation, when the MSP signal is in synchronization with the ISP signal, then the MSP signal represents the position of the instrument more precisely than the ISP signal represents the position of the instrument.

In one implementation, measuring comprises synchronizing the MSP signal to the ISP signal.

In one implementation, generating an MSP signal responsive to the position of the motor shaft comprises: generating a directional motor shaft rotation signal responsive to rotation of the motor shaft through a predetermined angle; and counting the motor shaft rotation signals to produce the MSP signal. In this implementation, synchronizing the MSP signal includes replacing the count with a synchronizing value, which synchronizing value might be a function of the ISP signal.

In one implementation, linking includes creating mechanical advantage between the motor shaft and the clutch, the mechanical advantage being quantified by a mechanical advantage ratio. In this implementation, counting the motor shaft rotation signals to produce the MSP signal would include replacing the count with the product of the value represented by the ISP signal multiplied by the mechanical advantage ratio.

In one implementation, the method also includes presenting information about the position of the instrument on a user interface.

In one implementation, the method also includes applying torque to the motor shaft in response to a drive signal generated in response to measurement of position of the instrument as a function of the MSP signal and the ISP signal. Generating the drive signal might include generating the drive signal in response to receiving information from the user interface and resolving the function of the MSP signal and the ISP signal that represents the position of the instrument.

According to another aspect of the present invention, there is provided an instrument, comprising: means for mounting the instrument for rotation; means for mounting a motor, the motor mounting means being adapted to transmit torque received from the motor; means for linking the instrument mounting means to the motor mounting means, the linking means having first and second operating modes, such that in the first operating mode, the instrument mounting means is engaged with the motor mounting means to rotate upon the urging of torque received from the motor mounting means, and in the second operating mode, the instrument mounting means is disengaged from the motor mounting means to rotate independently of the motor mounting means; means for generating a motor mounting means position signal ("MMMP signal") responsive to the position of the motor mounting means; means for generating an instrument mounting means position signal ("IMMP signal") responsive to the position of the instrument mounting means; and means for measuring the position of the instrument as a function of the MMMP signal and the IMMP signal.

In one implementation, the linking means further comprises means for clutching the motor mounting means to the instrument mounting means.

In one implementation, the apparatus further includes means for synchronizing the MMMP signal to the IMMP signal. The synchronizing means might activate in response to the IMMP signal, for example when the value represented by the MMMP signal differs from the value represented by the IMMP signal, such as by more than a threshold maximum error value. The threshold maximum error value might be equal, for example, to the absolute value of the historical maximum difference measured between the MMMP signal and the IMMP signal.

In one implementation, the function of the MMMP signal and the IMMP signal that measures the position of the instrument is defined as: if the MMMP signal is in synchronization with the IMMP signal, then the result of the function is the value represented by the MMMP signal; else, the result of the function is the value represented by the instrument mounting means signal. When the MMMP signal is in synchronization with the IMMP signal, then the MMMP signal represents the position of the instrument more precisely than the IMMP signal represents the position of the instrument.

In one implementation, the measuring means comprises means for synchronizing the MMMP signal to the IMMP signal and the means for generating an MMMP signal responsive to the position of the motor mounting means comprises: means for generating a directional motor mounting means rotation signal responsive to rotation of the motor mounting means through a predetermined angle; and means for counting the motor mounting means rotation signals to produce the MMMP signal. The means for synchronizing the MMMP signal might include means for loading a synchronizing value into the counting means to replace the existing MMMP signal, a possible synchronizing value being for example the result of a function of the IMMP signal.

In one implementation, the linking means further includes means for providing mechanical advantage between the motor mounting means and the clutching means, the mechanical advantage means having a ratio of mechanical advantage, and thus the means for loading a value that is a function of the IMMP signal would include means for loading the product of the value represented by the IMMP signal multiplied by the gear ratio.

In one implementation, the apparatus further includes means for presenting information about the position of the instrument on a user interface.

In one implementation, the apparatus further includes means for applying torque to the motor mounting means in response to a drive signal generated by the measuring means, for example wherein the measuring means generates the drive signal in response to information received from the user interface and the result of the function of the MMMP signal and the IMMP signal.

According to yet another aspect of the present invention, there is provided a computer program embodied in a processor-readable medium for measuring the position of an instrument mounted on an instrument shaft for rotation thereabout, the instrument shaft being linked to a motor shaft adapted to receive torque from a motor such that in a first operating mode the instrument shaft is engaged with the motor shaft to rotate upon the urging of torque received from the motor shaft and in a second operating mode the instrument shaft is disengaged from the motor shaft and free to rotate independently of the motor shaft, the computer program comprising code segments that direct a processor to: generate a motor shaft position signal ("MSP signal") responsive to the position of the motor shaft; generate an instrument shaft position signal ("ISP signal") responsive to the position of the instrument shaft; and measure the position of the instrument as a function of the MSP signal and the ISP signal.

In one implementation, the computer program further comprises code segments that direct a processor to synchronize the MSP signal to the ISP signal, for example in response to the ISP signal, such as when the value represented by the MSP signal differs from the value represented by the ISP signal, including differing by more than a threshold maximum error value. The threshold maximum error value could be equal to the absolute value of the maximum measured difference between the MSP signal and the ISP signal.

In one implementation, the function of the MSP signal and the ISP signal is defined as: if the MSP signal is in synchronization with the ISP signal, then the result of the function is the value represented by the MSP signal; else, the result of the function is the value represented by the ISP signal.

In one implementation, the MSP signal generating code segments direct a processor to: generate a directional motor shaft rotation signal responsive to rotation of the motor shaft through a predetermined angle and tally the motor shaft rotation signals in a counter to produce the MSP signal.

In one implementation, the synchronization code segments direct a processor to load a synchronizing value into the counter to replace the existing MSP signal, for example to load a value that is a function of the ISP signal, such as the product of the value represented by the ISP signal multiplied by a mechanical advantage ratio between the motor shaft and the instrument shaft.

In one implementation, the computer program further includes code segments that direct a processor to present information about the position of the instrument on a user interface.

In one implementation, the computer program further includes code segments that direct a processor to generate a drive signal to command a motor to apply torque to the motor shaft in response to measurement of the position of the instrument as a function of the MSP signal and the ISP signal. The drive signal code segments might direct a processor to generate the drive signal in response to receiving information from the user interface and resolving the function of the MSP signal and the ISP signal that represents the position of the instrument.

According to still another aspect of the present invention, there is provided a computer data signal embodied in a carrier wave for measuring the position of an instrument mounted on an instrument shaft for rotation thereabout, the instrument shaft being linked to a motor shaft adapted to receive torque from a motor such that in a first operating mode the instrument shaft is engaged with the motor shaft to rotate upon the urging of torque received from the motor shaft and in a second operating mode the instrument shaft is disengaged from the motor shaft and free to rotate independently of the motor shaft, comprising code segments that direct a processor to: generate a motor shaft position signal ("MSP signal") responsive to the position of the motor shaft; generate an instrument shaft position signal ("ISP signal") responsive to the position of the instrument shaft; and measure the position of the instrument as a function of the MSP signal and the ISP signal.

In one implementation, the computer data signal further comprises code segments that direct a processor to synchronize the MSP signal to the ISP signal, for example in response to the ISP signal, such as when the value represented by the MSP signal differs from the value represented by the ISP signal, including differing by more than a threshold maximum error value. The threshold maximum error value could be equal to the absolute value of the maximum measured difference between the MSP signal and the ISP signal.

In one implementation, the function of the MSP signal and the ISP signal is defined as: if the MSP signal is in synchronization with the ISP signal, then the result of the function is the value represented by the MSP signal; else, the result of the function is the value represented by the ISP signal.

In one implementation, the MSP signal generating code segments direct a processor to: generate a directional motor shaft rotation signal responsive to rotation of the motor shaft through a predetermined angle and tally the motor shaft rotation signals in a counter to produce the MSP signal.

In one implementation, the synchronization code segments direct a processor to load a synchronizing value into the counter to replace the existing MSP signal, for example to load a value that is a function of the ISP signal, such as the product of the value represented by the ISP signal multiplied by a mechanical advantage ratio between the motor shaft and the instrument shaft.

In one implementation, the computer data signal further includes code segments that direct a processor to present information about the position of the instrument on a user interface.

In one implementation, the computer data signal further includes code segments that direct a processor to generate a drive signal to command a motor to apply torque to the motor shaft in response to measurement of the position of the instrument as a function of the MSP signal and the ISP signal. The drive signal code segments might direct a processor to generate the drive signal in response to receiving information from the user interface and resolving the function of the MSP signal and the ISP signal that represents the position of the instrument.

Further aspects and advantages of the present invention will become apparent upon considering the following drawings, description, and claims.

DESCRIPTION OF THE INVENTION

The invention will be more fully illustrated by the following detailed description of non-limiting specific embodiments in conjunction with the accompanying drawing figures. In the figures, similar components and/or features may have the same reference label. Further, various components of the same type may be distinguished by following the reference label with a second label that distinguishes among the similar components. If only the first reference label is identified in a particular passage of the detailed description, then that passage describes any one of the similar components having the same first reference label irrespective of the second reference label.

DETAILED DESCRIPTION OF SPECIFIC EMBODIMENTS

(a) Structure of Specific Embodiments

The structure of the invention will now be illustrated by way of non-limiting specific exemplary embodiments shown in the drawing figures and described in greater detail herein.

(i) First Embodiment

Figure 1:
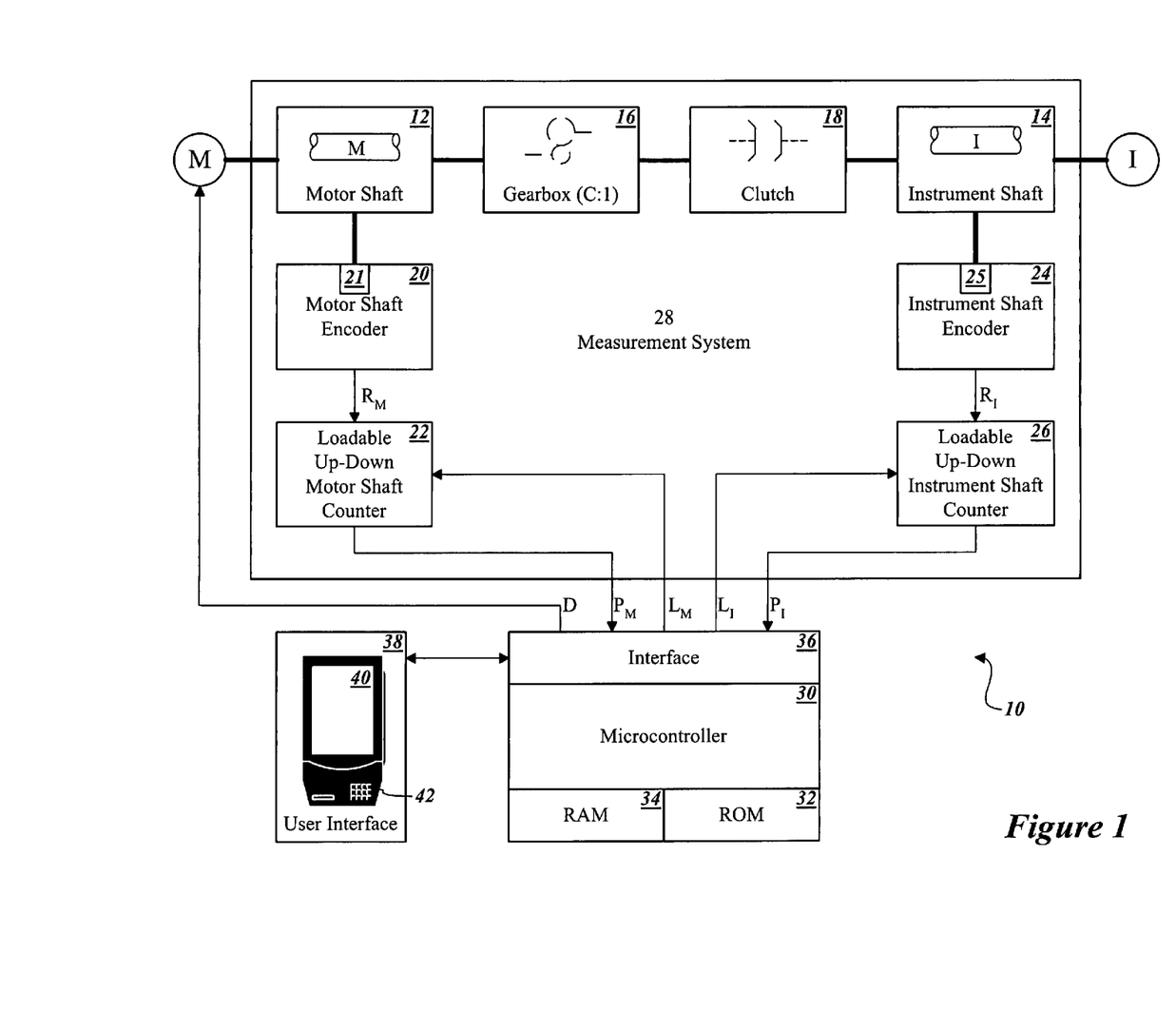
FIG. 1 is a block diagram of an instrument mounting system with dual encoders, according to a first embodiment of the present invention.

FIG. 1 shows an instrument mounting system with dual encoders according to a first embodiment of the present invention, generally illustrated at 10. The mounting system 10 includes a motor shaft 12 configured to receive torque from a motor M and an instrument shaft 14 configured to apply torque to and receive torque from an instrument I. The motor shaft 12 is coupled to the instrument shaft 14 through a gearbox 16 and a clutch 18. In essence, the clutch 18 and the gearbox 16 form two parts of a linkage between the motor shaft 12 and the instrument shaft 14, the linkage having alternative first and second operating modes, such that in the first operating mode, the instrument shaft 14 is engaged with the motor shaft 12 to rotate upon the urging of torque received from the motor shaft and in the second operating mode, the instrument shaft 14 is disengaged from the motor shaft 12 to rotate independently of the motor shaft 12.

The motor shaft 12 is also coupled to a motor shaft encoder 20, which generates an electrical motor shaft rotation signal $R_M$ in response to the motor shaft 12 rotating through a predetermined angle. Also encoded in the motor shaft rotation signal $R_M$ is whether the motor shaft 12 rotated clockwise or counterclockwise, so that the motor shaft rotation signal $R_M$ is directional.

The motor shaft encoder 20 itself is conventional and in this embodiment is implemented using incremental position encoding and infrared sensing; however, those skilled in the art will appreciate that analogous alternatives exist, including absolute position encoding and magnetic, electrical and mechanical sensing.

In this embodiment, the infrared sensing is implemented using two model LTE-302-M light emitting diodes as infrared transmitters (not illustrated) and two model LTR-5576DP1 phototransistors as infrared receivers (not illustrated), all from the Lite-On Technology Corporation, 22F No. 392 Ruey Kuang Road, Neihu, Taipei 114, Taiwan, R.O.C. Each respective light emitting diode is optically coupled to a respective phototransistor along an optical path, the two optical paths being substantially parallel but not coincident. Each respective phototransistor generates a first electrical signal in response to detecting infrared radiation from its respective light emitting diode and to generate a second electrical signal in response to not detecting infrared radiation from its respective light emitting diode.

The two optical paths are intersected by a disc (not illustrated) that is coupled to the motor shaft 12 for rotation in synchronization therewith, such that the rotation of the disc is an analogue for the rotation of the motor shaft 12. The disc may either be coupled directly to the motor shaft 12 are else, as illustrated in FIG. 1, may be coupled to the motor shaft through a reduction gearbox, in this case a motor shaft encoder gearbox 21.

The disc has alternating opaque and transparent portions for alternately blocking and transmitting infrared radiation from a respective light emitting diode to its respective phototransistor. In this embodiment, the disc is customer-fabricated and opaque; the transparent portions are formed as holes that pierce the disc in a pattern conventional for incrementally encoding its angular position. Additionally, the direction of the disc's angular motion can be determined by the relative position of the two phototransistors in combination with whether the electrical signal generated by one phototransistor leads or alternatively lags the electrical signal generated by the other phototransistor.

It has been found that a motor shaft encoder 20 so implemented can measure the angular position of the motor shaft 12 to a typical resolution of two degrees if directly coupled to the motor shaft 12 and to a typical resolution of 0.72 arc seconds if coupled to the motor shaft 12 through a 10,000:1 reduction gearbox, such as the motor shaft encoder gearbox 21. Those skilled in the art will appreciate that including a reduction gearbox may introduce inaccuracies caused by backlash between gears.

The motor shaft encoder 20 is coupled to supply the motor shaft rotation signal $R_M$ to a loadable, up-down motor shaft counter 22, so as to increment the motor shaft counter 22 whenever the motor shaft 12 rotates clockwise through the predetermined angle and to decrement the motor shaft counter 22 whenever the motor shaft 12 rotates counterclockwise through the predetermined angle.

Similarly, the instrument shaft 14 is coupled to an instrument shaft encoder 24, which generates an electrical instrument shaft rotation signal $R_I$ in response to the instrument shaft 14 rotating through a predetermined angle. Also encoded in the electrical instrument shaft rotation signal $R_I$ is whether the instrument shaft 14 rotated clockwise or counterclockwise, so that the instrument shaft rotation signal $R_I$ is directional.

The instrument shaft encoder 24 itself is conventional and in this embodiment is similar to the motor shaft encoder 20. It has been found that an instrument shaft encoder 24 so implemented can measure the angular position of the instrument shaft 14 to a typical resolution of two degrees if directly coupled to the instrument shaft 14 and to a typical resolution of 480 arc seconds if coupled to the instrument shaft 14 through a 15:1 reduction gearbox, such as an instrument shaft encoder gearbox 25.

Those skilled in the art will appreciate that analogous shaft encoding alternatives exist, including absolute position encoding and magnetic, electrical and mechanical sensing.

The instrument shaft encoder 24 is coupled to supply the instrument shaft rotation signal $R_I$ to a loadable up-down instrument shaft counter 26, so as to increment the instrument shaft counter 24 whenever the instrument shaft 14 rotates clockwise through the predetermined angle and to decrement the instrument shaft counter 26 whenever the instrument shaft 14 rotates counterclockwise through the predetermined angle.

So configured, the motor shaft 12, the instrument shaft 14, the gearbox 16, the clutch 18, the motor shaft encoder 20, the motor shaft counter 22, the instrument shaft encoder 24, and the instrument shaft counter 26 form a measurement system 28 for the motor M and the instrument I.

The mounting system 10 further includes a microcontroller 30, which is configured as is well-known in the art to interact with a read only memory (ROM 32), a random access memory (RAM 34), and a set of interface ports 36, for example serial ports and/or parallel ports. In this embodiment, it has been found that the PIC16C63A microcontroller from Microchip Technology Inc., 2355 West Chandler Blvd., Chandler, Ariz., USA 85224-6199 is satisfactory as the microcontroller 30.

The ROM 32 is a medium for storing codes that instruct the microcontroller 30 to provide the functionality of the present invention as well as the functionality of more conventional instrument mounting systems. The RAM 34 provides the microcontroller 30 with volatile storage registers for performing and storing the results of the binary operations that implement such functionality. The interface ports 36 enable the microcontroller 30 to communicate with the motor shaft counter 22, the instrument shaft counter 26, the motor M, and a user interface 38 having for example a display 40 and a keypad 42, as will be discussed in more detail below with regard to operation. In general terms, codes stored in the ROM 32 instruct the microcontroller 30 to control the speed and direction of the motor M in response to user-commands submitted through the user interface 38 and the position of the motor shaft 12 and the instrument shaft 14 as represented by the states of the motor shaft counter 22 and the instrument shaft counter 26 respectively.

Although for ease of explanation the motor shaft counter 22 and the instrument shaft counter 26 have been illustrated as being discretely implemented in hardware, those skilled in the art will appreciate that either or both might alternatively be implemented in software or as a register in the microcontroller 30.

(ii) Second Embodiment

Figure 2:
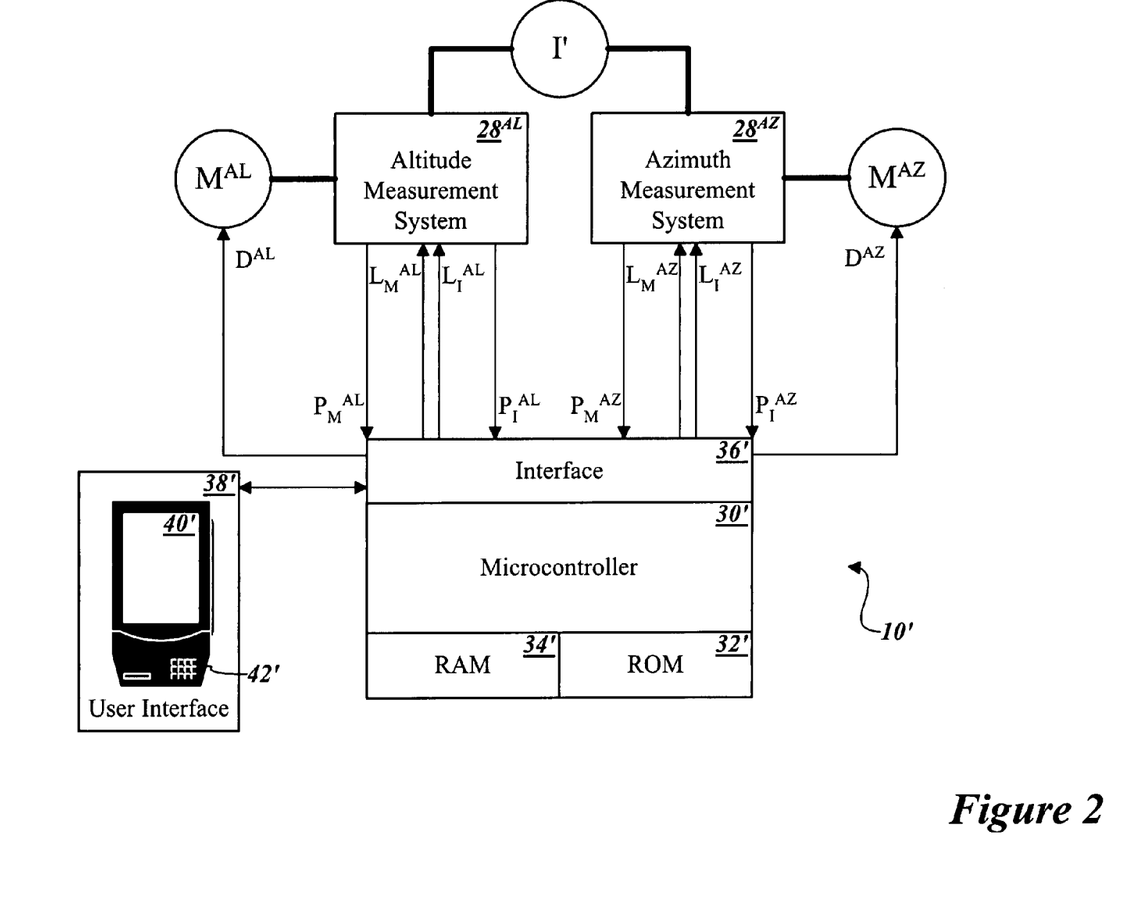
FIG. 2 is a block diagram of an instrument mounting system with dual encoders, according to a second embodiment of the present invention.

FIG. 2 shows an instrument mounting system with dual encoders according to a second embodiment of the present invention, generally illustrated at 10'. The mounting system 10' includes an altitude measurement system $28^{AL}$ coupled between an instrument I' and an altitude motor $M^{AL}$ and an azimuth measurement system $28^{AZ}$ coupled between the instrument I' and an azimuth motor $M^{AZ}$. Those skilled in the art will recognize that the invention would also be suitable for use with other mounting geometries, for example an equatorial mount with right ascension and declination axes. Although as illustrated in the second embodiment the axes of rotation are orthogonal, the invention would also be suitable for nonorthogonal applications.

The mounting system 10' further includes a microcontroller 30', which is configured as is well-known in the art to interact with a read only memory (ROM 32'), a random access memory (RAM 34'), and a set of interface ports 36', for example serial ports and/or parallel ports.

The ROM 32' is a medium for storing codes that instruct the microcontroller 30' to provide the functionality of the present invention as well as the functionality of more conventional instrument mounting systems. The RAM 34' provides the microcontroller 30' with volatile storage registers for performing and storing the results of the binary operations that implement such functionality. The interface ports 36' enable the microcontroller 30' to communicate with the altitude measurement system $28^{AL}$, the azimuth measurement system $28^{AZ}$, the altitude motor $M^{AL}$, the azimuth motor $M^{AZ}$, and a user interface 38' having for example a display 40' and a keypad 42', as will be discussed in more detail below with regard to operation. In general terms, codes stored in the ROM 32' instruct the microcontroller 30' to control the speed and direction of the altitude motor $M^{AL}$ and the azimuth motor $M^{AZ}$ in response to user-commands submitted through the user interface 38' and the position of the instrument I' as represented by the states of the altitude measurement system $28^{AL}$ and the azimuth measurement system $28^{AZ}$.

Those skilled in the art will easily appreciate that this embodiment is extensible to additional or alternative axes beyond altitude and azimuth, which two axes where specifically selected only for purposes of illustration.

(b) Operation of Specific Embodiments

With reference now to FIGS. 1 through 7, the operation of these specific embodiments of the invention will now be described.

(i) First Embodiment (A) Calibration

As can be best understood with reference first to FIG. 1, operation of the mounting system 10 begins with a user planting the motorized mounting system 10 in place, securing the instrument I on the instrument shaft 14, and then beginning to calibrate the mounting system 10 by manually rotating the instrument shaft 14 until the instrument I is aimed at a predetermined reference point, for example the North Star, Polaris. Using the keypad 42, the user then instructs the microcontroller 30 to begin a calibration process, in which the current location and aiming vector of the instrument I define the origin of a coordinate system. During this calibration process, the microcontroller 30 resets the motor shaft counter 22 and the instrument shaft counter 26, causing each to be loaded with a count in the middle of its range, for example by applying respective load signals $L_M$ and $L_I$ to the counters' respective load terminals. During this calibration process, the microcontroller 30 also receives data defining the location of the instrument I, such as latitude and longitude coordinates, for example as output supplied by a global positioning satellite system (not shown) or as user-input supplied by the user via the keypad 42.

(B) General Use

Once the calibration process has been completed, the measurement system 28 measures the location of the instrument I relative to the calibration origin coordinates. As the instrument shaft 14 rotates, either as a result of torque applied manually be the user or else as a result of torque applied by the motor M via the motor shaft 12, the gearbox 16 and the clutch 18, the instrument shaft encoder 24 generates an electrical instrument shaft rotation signal $R_I$ every time that the instrument shaft 14 rotates through a predetermined angle, the instrument shaft rotation signal $R_I$ further encoding whether such rotation was in the clockwise or else the counterclockwise direction.

The instrument shaft encoder 24 supplies the instrument shaft rotation signal $R_I$ to the up-down instrument shaft counter 26, which increments the instrument shaft counter 26 whenever the instrument shaft 14 rotates clockwise through the predetermined angle and decrements the instrument shaft counter 26 whenever the instrument shaft 14 rotates counterclockwise through the predetermined angle, thus tallying the instrument shaft rotation signals $R_I$. The instrument shaft counter 26 provides its count to the microcontroller 30 as an electrical instrument shaft position signal $P_I$ supplied to one of the interface ports 36. The instrument shaft position signal PI is a multi-bit signal, the least significant bit ("LSB") of which is designated as $P_{I0}$. In essence, the instrument shaft encoder 24 and the instrument shaft counter 26 combine to become an instrument shaft position detector and means for generating an instrument shaft position signal responsive to the position of the instrument shaft 14.

Similarly, as the motor M operates, rotating in a direction and at a speed in response to an electrical drive signal D from the microcontroller 30, it applies a torque to the motor shaft 12, urging the motor shaft 12 to rotate. The motor shaft encoder 20 generates an electrical motor shaft rotation signal $R_M$ every time that the motor shaft 12 rotates through a predetermined angle, the motor shaft rotation signal $R_M$ further encoding whether such rotation was in the clockwise or else the counterclockwise direction.

The motor shaft encoder 20 supplies the motor shaft rotation signal $R_M$ to the up-down motor shaft counter 22, which increments the motor shaft counter 22 whenever the motor shaft 12 rotates clockwise through the predetermined angle and decrements the motor shaft counter 22 whenever the motor shaft 12 rotates counterclockwise through the predetermined angle, thus tallying the motor shaft rotation signals $R_M$. The motor shaft counter 22 provides its count to the microcontroller 30 as an electrical motor shaft position signal $P_M$ supplied to one of the interface ports 36. The motor shaft position signal $P_M$ is a multi-bit signal, the LSB of which is designated as $P_{M0}$. In essence, the motor shaft encoder 20 and the motor shaft counter 22 combine to become a motor shaft position detector and means for generating a motor shaft position signal responsive to the position of the motor shaft 12.

Figure 3:
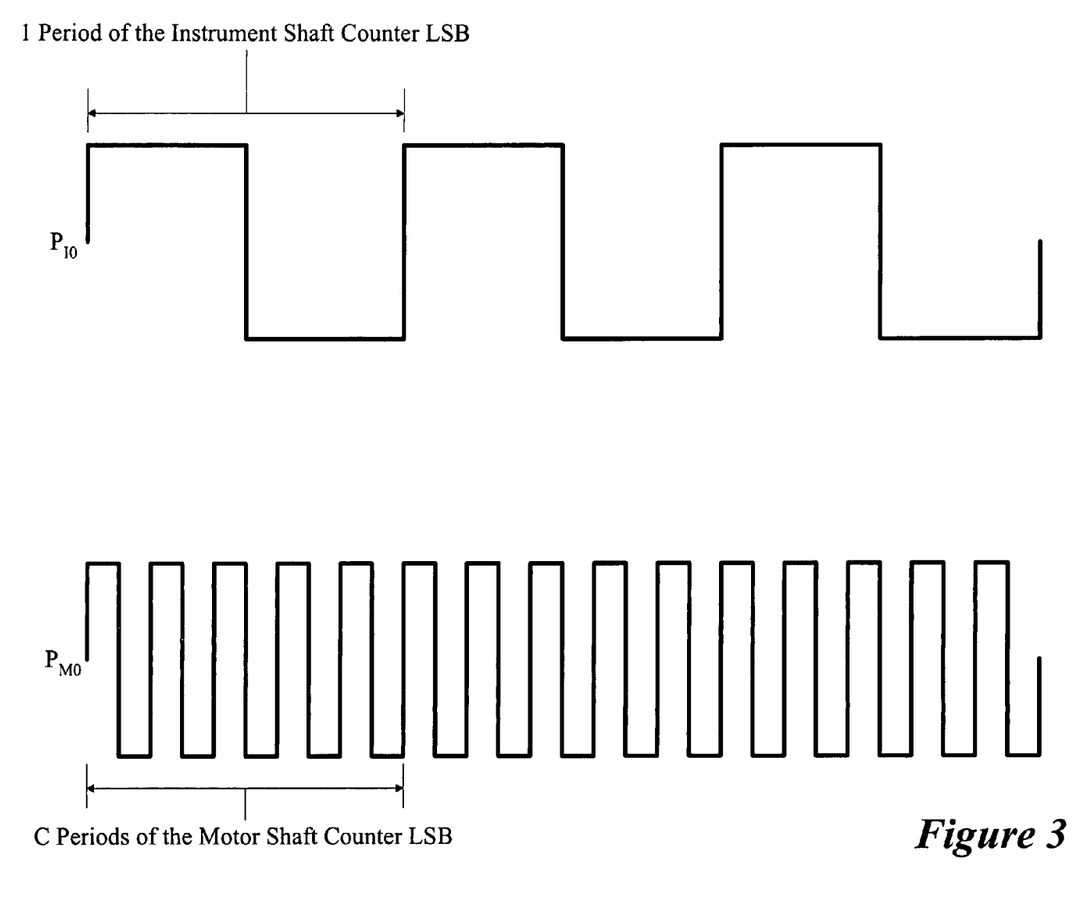
FIG. 3 is a signal timing diagram, illustrating the operation of the first and second embodiments of the invention in a synchronized condition.

As can be best understood with reference to FIGS. 1 and 3, it will be appreciated that so long as the motor shaft 12 and the instrument shaft 14 are directly engaged through the clutch 18, every time the instrument shaft 14 rotates through a predetermine angle, the motor shaft will have rotated through a multiple of that predetermined angle, the multiple being a constant equal to the gear ratio C. Thus in this condition, for every period of the LSB $P_{I0}$ in the instrument shaft counter 26, there will exist C periods of the LSB $P_{M0}$ in the motor shaft counter 22. Therefore, the counts respectively stored in the instrument shaft counter 26 and the motor shaft counter 22 will both accurately represent the position of the instrument shaft 14 (and thus the instrument I) relative to the calibration origin coordinates; however, the count stored in the motor shaft counter 22 will be C-times more precise.

Figure 4:
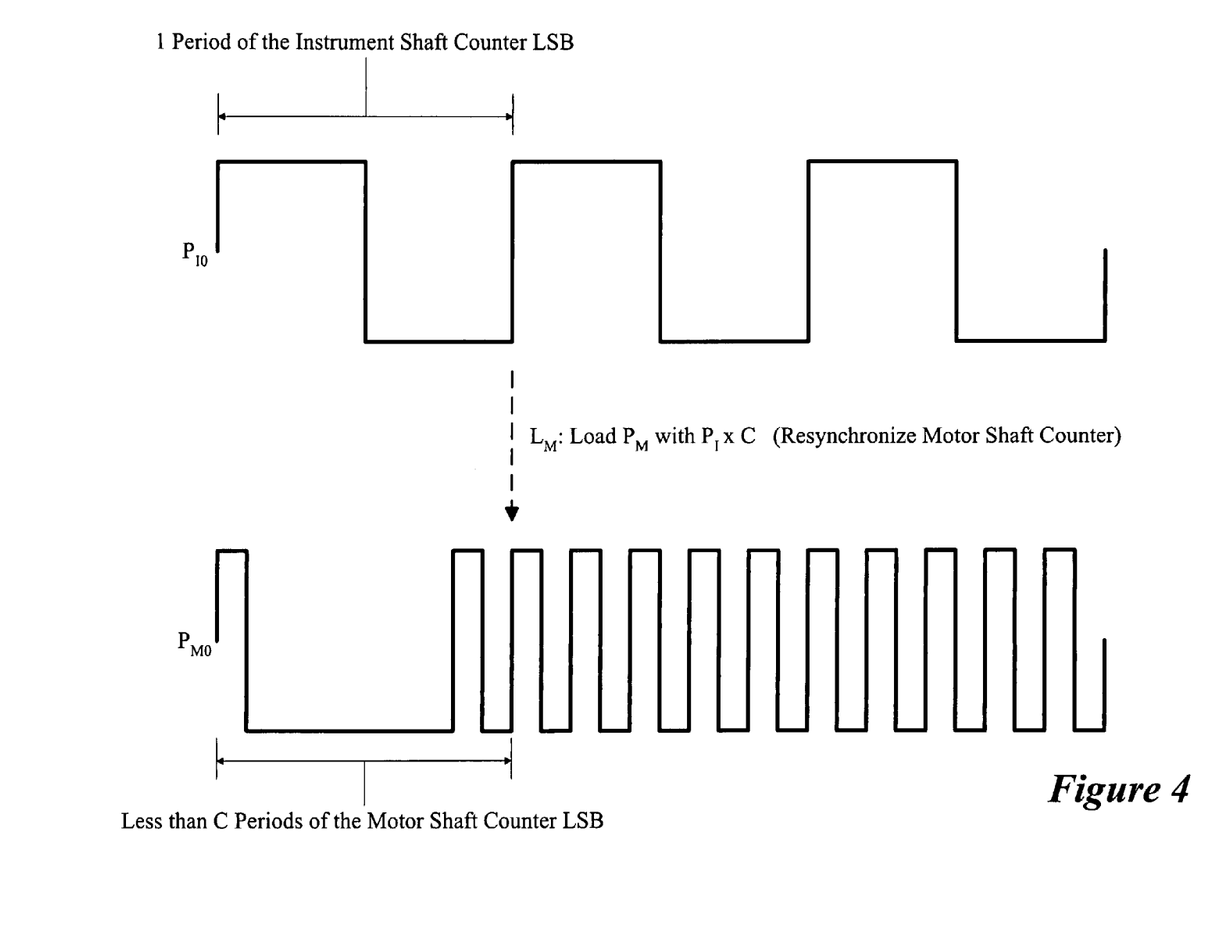
FIG. 4 is a signal timing diagram, illustrating the operation of the first and second embodiments of the invention in an unsynchronized condition.

As can be best understood with reference to FIGS. 1 and 4, it will be appreciated that the motor shaft position signal $P_M$ will cease to accurately represent the position of the instrument I whenever the clutch 18 is disengaged such that the motor shaft 12 and the instrument shaft 14 are free to rotate independently. Thus, as the instrument shaft 14 rotates through a predetermine angle, for example in response to a manually applied torque, the motor shaft may remain stationary or may rotate through a different angle and even in a different direction, upon the urging of the motor M. Thus in this condition, for every period of the LSB $P_{I0}$ in the instrument shaft counter 26, there will not necessarily exist C periods of the LSB $P_{M0}$ in the motor shaft counter 22; there may be more than C periods of the LSB $P_{M0}$ in the motor shaft counter 22 or less than C periods, as is illustrated in FIG. 4.

Thus the microcontroller 30 can measure the position of the instrument I as a function of the motor shaft position signal $P_M$ and the instrument shaft position signal $P_I$. If the motor shaft position signal $P_M$ is in synchronization with the instrument shaft position signal $P_I$, then both such signals are accurate and the microcontroller 30 can resolve the function as the more precise shaft position signal $P_M$. If however, the motor shaft position signal $P_M$ is not in synchronization with the instrument shaft position signal $P_I$, then only the latter is accurate and the microcontroller 30 can resolve the function as the less precise but accurate instrument position signal $P_I$.

After the motor shaft position signal $P_M$ has ceased to accurately represent the position of the instrument I, it is desirable to restore that accuracy by resynchronizing the motor shaft position signal $P_M$ with the instrument shaft position signal $P_I$. This resynchronization is performed by the microcontroller 30 under the direction of program code stored in the ROM 32, three alternatives of which 50, 50', 50" are illustrated in flowchart form in FIGS. 5 through 7 respectively.

(C) Basic Synchronization

Figure 5:
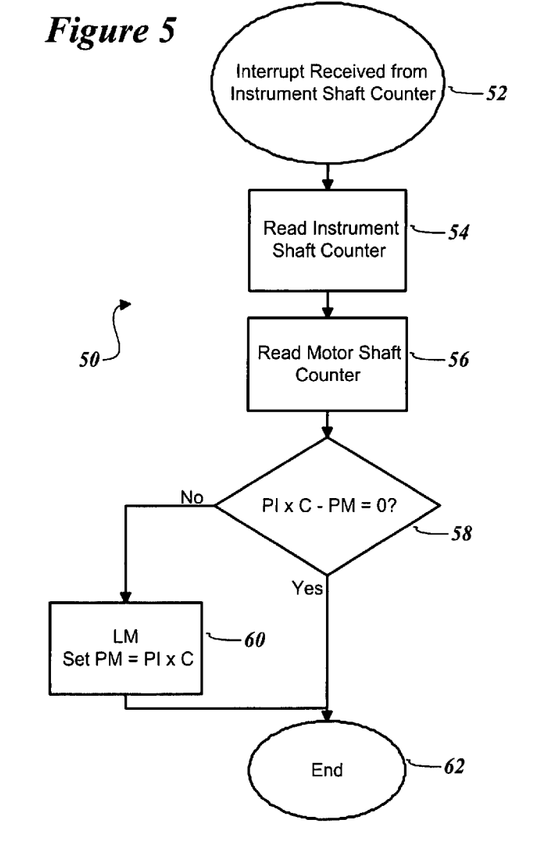
FIG. 5 is a flowchart diagram of a basic synchronization process.

As can be best understood with reference to FIGS. 4 and 5, the first alternative program code 50 will be discussed now. In a first step 52, the microcontroller 30 is interrupted by a transition in the instrument shaft position signal $P_I$. As illustrated, that transition is a transition in the instrument shaft position signal $P_I$ LSB $P_{I0}$ from a low state to a high state; however, those skilled in the art will recognize that one might instead chose a transition from a high state to a low state, a transition from either state to the opposite state, or a transition of a different bit in the instrument shaft position signal $P_I$. Alternatively, one might interrupt the microcontroller 30 with a signal from the instrument shaft encoder 24.

In a second step 54, the microcontroller 30 is directed to read the contents of the instrument shaft counter 26 as represented by the instrument shaft position signal $P_I$ and in a third step 56, the microcontroller 30 is directed to read the contents of the motor shaft counter 22 as represented by the motor shaft position signal $P_M$.

In a fourth step 58, the microcontroller 30 is directed to evaluate the difference between the product of the value represented by the instrument shaft position signal $P_I$ and a constant equal to the gear ratio C, as minuend, and the value represented by the motor shaft position signal $P_M$, as subtrahend.

If the difference is not equal to zero, then motor shaft counter 22 is out of synchronization with the instrument shaft counter 26, and so in a fifth step 60 the microcontroller 30 is directed to issue a load signal $L_M$ to the motor shaft counter 22 to cause it to store a value equal to the product of the value represented by the instrument shaft position signal $P_I$ and the constant equal to the gear ratio C. Finally, in a sixth step 62, the microcontroller 30 is directed to terminate execution of the first alternative program code 50.

Alternatively, if the difference evaluated in the fourth step 58 is equal to zero, then the motor shaft counter 22 is in synchronization with the instrument shaft counter 26, and so the microcontroller 30 is immediately directed at the sixth step 62 to terminate execution of the first alternative program code 50.

Those skilled in the art will recognize that various changes, modifications, additions and substitutions can be made to the first alternative program code 50 without departing from the principle and scope of the invention. For example, if the motor shaft encoder 20 and the instrument shaft encoder 24 have different resolutions, then the minuend would be the product of the value represented by the instrument shaft position signal $P_I$ and a constant equal to the product of the gear ratio C and the ratio between the respective resolutions of the motor shaft encoder 20 and the instrument shaft encoder 24.

(D) Complex Synchronization

Figure 6:
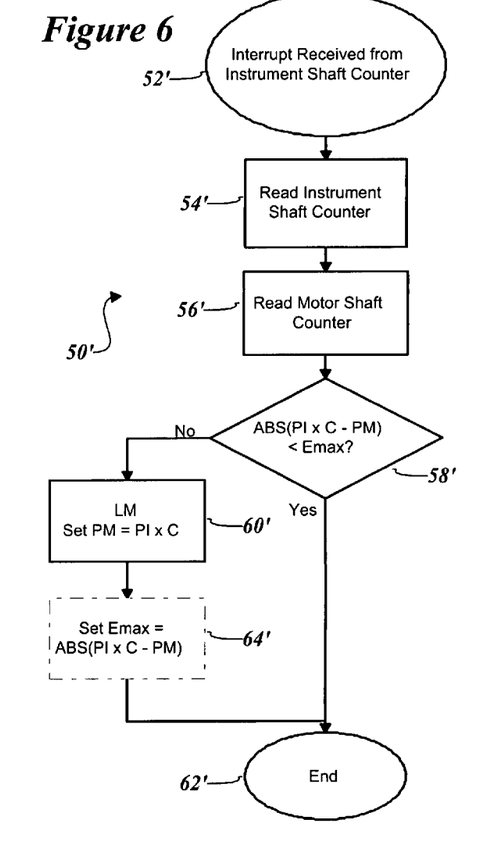
FIG. 6 is a flowchart diagram of a more complicated synchronization process.

As can be best understood with reference to FIG. 6, the second alternative program code 50' will be discussed now. The second alternative program code 50' implements the recognition that in real world operation it is unlikely that the difference will ever evaluate to zero and that therefore the motor shaft counter 22 may be resynchronized every time that the first alternative program code 50 is executed. Such regular resynchronization could result in disadvantages, for example an unnecessary loss of precision when the motor shaft counter 22 was still accurate.

To overcome the potential for such disadvantages, in the second alternative program code 50' the fourth step 58' has been modified. In the modified fourth step 58', the absolute value of the difference is compared to a threshold maximum acceptable error $E_{max}$.

If the absolute value of the difference is less than maximum acceptable error $E_{max}$, then the microcontroller 30 is immediately directed at the sixth step 62' to terminate execution of the second alternative program code 50', because the motor shaft counter 22 is still essentially in synchronization with the instrument shaft counter 26.

Alternatively, if the absolute value of the difference is not less than maximum acceptable error $E_{max}$, then the motor shaft counter 22 is unacceptably out of synchronization with the instrument shaft counter 26, and so microcontroller 30 is first directed at the fifth step 60' to resynchronize the motor shaft counter 22, after which the microcontroller 30 is directed at the sixth step 62' to terminate execution of the second alternative program code 50'.

In one implementation, the threshold maximum acceptable error $E_{max}$ is simply the historical maximum error that has been encountered since the mounting system 10 was last calibrated. In this implementation, after the fifth step 60', the microcontroller 30 is directed at a seventh step 64' to set the threshold maximum acceptable error $E_{max}$ equal to the absolute value of the difference that triggered resynchronization.

(E) Streamlined Synchronization

Figure 7:
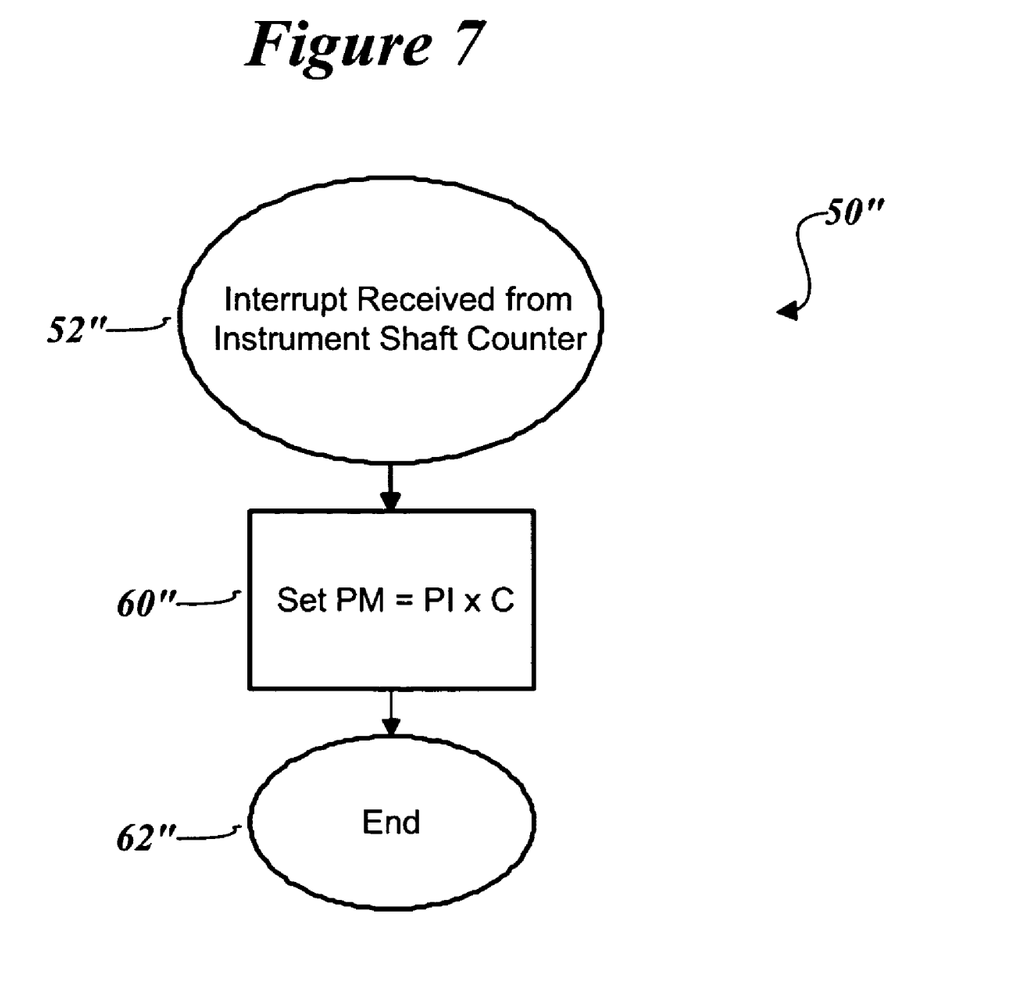
FIG. 7 is a flowchart of a more streamlined synchronization process.

As can be best understood with reference to FIG. 7, the third alternative program code 50" will be discussed now. The third alternative program code 50" implements in a different way the recognition that in real world operation it is unlikely that the difference will ever evaluate to zero and that therefore the motor shaft counter 22 may be resynchronized every time that the first alternative program code 50 is executed. In the case of such regular resynchronization, there is little benefit in error testing at all and such testing has computational costs.

To overcome the potential for such disadvantages, in the third alternative program code 50" the second step 54, 54', third step 56, 56', fourth step 58, 58', and seventh step 64' have been eliminated and only the first step 52", fifth step 60" and sixth step 62" have been retained.

In the third alternative program code 50", every time that the microcontroller 30 is interrupted by a transition in the instrument shaft position signal $P_I$ at the first step 52", then at the fifth step 60" the microcontroller 30 is directed to issue a load signal $L_M$ to the motor shaft counter 22 to cause it to store a value equal to the product of the value represented by the instrument shaft position signal $P_I$ and the constant equal to the gear ratio C. Finally, in a sixth step 62", the microcontroller 30 is directed to terminate execution of the third alternative program code 50".

(ii) Second Embodiment

As can be best understood with reference to FIGS. 2 through 6, the operation of the second embodiment of the mounting system 10' is similar to the operation of the first embodiment of the mounting system 10, except for the fact that in the second embodiment of the mounting system 10' multiple axes of rotation are being monitored and controlled, as illustrated altitude and azimuth.

(c) Description Summary

Thus, it will be seen from the foregoing embodiments and examples that there has been described a way to measure the position of an instrument that is mounted on an instrument shaft within a clutched mounting system, the instrument shaft being driven through a reduction gearbox by a motor shaft. The position of the instrument is measured as a function of the position of the motor shaft and the position of the instrument shaft, the measurement of the position of the motor shaft providing greater precision than the position of the instrument shaft. Because the mounting system is clutched, it is necessary to check at intervals whether the measurement of the motor shaft position no longer accurately represents the position of the instrument, in which case the measurement of the motor shaft position is resynchronized to the measurement of the instrument shaft.

While specific embodiments of the invention have been described and illustrated, such embodiments should be considered illustrative of the invention only and not as limiting the invention as construed in accordance with the accompanying claims.

It will be understood by those skilled in the art that various changes, modifications, additions, and substitutions can be made to the foregoing embodiments without departing from the principle and scope of the invention expressed in the claims made herein.

For simplicity of illustration, the position of the motor shaft 12 has been described as being measured directly and the position of the instrument shaft 14 has been described as being measured either directly or indirectly through measurement of the motor shaft 12. However, those skilled in the art will appreciate that the position of either such shaft could also be measured indirectly by measurement of another part engaged to the shaft through the mechanism, taking into account gear ratios (C—as illustrated in the specific embodiments) and other forms of mechanical advantage, and recognizing that a resynchronization is necessary after the part has been disengaged from the shaft. Thus, any mention in this document of measuring the position of a shaft should be read broadly to include measuring a part engaged, at least some of the time, to the shaft.

Again for simplicity of illustration, the motor shaft 12 and the instrument shaft 14 have been described as shafts; however, in many application other forms of rotating mechanisms could be substituted without departing from the principle and scope of the invention. For example, those skilled in the art will appreciate that a coupling, adapter, or receptacle might cooperate with or substitute for any such shaft.

Although as illustrated the mounting system 10, 10' is controlled by a microcontroller 30, 30', those skilled in the art will appreciate that other forms of control would also be suitable.

Although the microcontroller 30, 30' and the user interface 38, 38' might be hardwired to or located proximate to each other or to the measurement system 28, 28$^{AL}$, 28$^{AZ}$, the motor M, $M^{AL}$, $M^{AZ}$ and the instrument I, I', neither such hardwiring nor such proximity is necessary. In some applications, wireless connection and/or remote location would be advantageous.

While the invention has been described as having particular application for telescopes, those skilled in the art will recognize it has wider application, for example for use with cameras, microscopes, microphones, antennas and other instruments and objects that involve aiming or targeting.

What is claimed is:

1. An apparatus for positioning an instrument, the apparatus comprising:
   (a) a motor shaft adapted to receive torque from a motor;
   (b) a rotatable instrument coupled to an instrument shaft for rotation therewith,
   (c) a linkage between the motor shaft and the instrument shaft, the linkage having alternative first and second operating modes, wherein:
      (i) in the first operating mode, the instrument shaft engages the motor shaft such that the instrument shaft and the instrument rotate upon the urging of torque received from the motor shaft; and
      (ii) in the second operating mode, the instrument shaft is disengaged from the motor shaft such that the instrument and the instrument shaft are rotatable independently of the motor shaft;
   (d) a motor shaft position detector ("MSP detector") operable to generate a motor shaft position signal ("MSP signal") responsive to an angular position of the motor shaft about a motor shaft axis;
   (e) an instrument shaft position detector ("ISP detector") operable to generate an instrument shaft position signal ("ISP signal") responsive to an angular position of the instrument shaft about an instrument shaft axis; and
   (f) a controller coupled to receive the MSP signal from the MSP detector and to receive the ISP signal from the ISP detector and configured to determine an angular position of the instrument as a function of the MSP signal and the ISP signal and to operate the motor to position the instrument based at least in part on the determined angular position of the instrument.

2. An apparatus as claimed in claim 1, wherein the linkage comprises a clutch coupled between the instrument shaft and the motor shaft.

3. An apparatus as claimed in claim 2, wherein the controller is configured to synchronize the MSP signal to the ISP signal.

4. An apparatus as claimed in claim 3, wherein the controller is configured to synchronize the MSP signal to the ISP signal in response to the ISP signal.

5. An apparatus as claimed in claim 3, wherein the controller is configured to synchronize the MSP signal to the ISP signal when a first estimated position of the instrument determined as a function of the MSP signal independent of the ISP signal differs from a second estimated position of the instrument determined as a function of the ISP signal independent of the MSP signal.

6. An apparatus as claimed in claim 5, wherein the controller is configured to synchronize the MSP signal to the ISP signal when the first estimated position of the instrument differs from the second estimated position of the instrument by more than a threshold value.

7. An apparatus as claimed in claim 6, wherein the threshold value is equal to the absolute value of a maximum historical difference between the first estimated position of the instrument and the second estimated position of the instrument.

8. An apparatus as claimed in claim 6, wherein in the controller, the function of the MSP signal and the ISP signal that determines the position of the instrument is defined as: if the MSP signal is synchronized with the ISP signal, then the result of the function is the first estimated position of the instrument otherwise, the result of the function is the second estimated position of the instrument.

9. An apparatus as claimed in claim 8, wherein the function of the MSP signal and the ISP signal that determines the position of the instrument is more precise when the MSP signal is synchronized with the ISP signal.

10. An apparatus as claimed in claim 8, wherein the MSP detector comprises:
    (a) a shaft encoder, operable to generate a directional motor shaft rotation signal responsive to rotation of the motor shaft through a predetermined angle about the motor shaft axis; and
    (b) an up-down counter coupled to the shaft encoder to receive motor shaft rotation signals and operable to tally the motor shaft rotation signals into the MSP signal.

11. An apparatus as claimed in claim 10, wherein:
    (a) the up-down counter is a loadable counter; and
    (b) the controller is operable to synchronize the MSP signal by loading a synchronizing value into the up-down counter to replace the existing MSP signal.

12. An apparatus as claimed in claim 11, wherein the synchronizing value is a function of the ISP signal.

13. An apparatus as claimed in claim 12, wherein the linkage comprises a gearbox coupled between the motor shaft and the clutch, the gearbox having a gear ratio.

14. An apparatus as claimed in claim 13, wherein the function of the ISP signal is a product of a value represented by the ISP signal and the gear ratio.

15. An apparatus as claimed in claim 14, comprising a user interface coupled to the controller so as to receive information about the position of the instrument and operable to present information about the position of the instrument.

16. An apparatus as claimed in claim 15, wherein the motor is configured to apply torque to the motor shaft in response to a drive signal generated by the controller.

17. An apparatus as claimed in claim 16, wherein the controller generates the drive signal in response to information received from the user interface and the result of the function of the MSP signal and the ISP signal that determines the position of the instrument.

18. A method for positioning an instrument, comprising:
    (a) mounting the instrument on an instrument shaft for rotation therewith;
    (b) linking the instrument shaft to a motor shaft adapted to receive torque from a motor, wherein:
        (i) in a first operating mode, the instrument shaft engages the motor shaft such that the instrument shaft and the instrument rotate upon the urging of torque received from the motor shaft; and
        (ii) in a second operating mode, the instrument shaft is disengaged from the motor shaft such that the instrument and instrument shaft are rotatable independently of the motor shaft;
    (c) generating a motor shaft position signal ("MSP signal") responsive to an angular position of the motor shaft about a motor shaft axis;
    (d) generating an instrument shaft position signal ("ISP signal") responsive to an angular position of the instrument shaft about an instrument shaft axis;
    (e) determining an angular position of the instrument as a function of the MSP signal and the ISP signal; and
    (f) operating the motor to position the instrument based at least in part on the determined angular position of the instrument.

19. A method as claimed in claim 18, wherein linking the instrument shaft to the motor shaft comprises coupling a clutch between the instrument shaft and the motor shaft.

20. A method as claimed in claim 19, comprising synchronizing the MSP signal to the ISP signal.

21. A method as claimed in claim 20, wherein synchronizing the MSP signal to the ISP signal is performed in response to the ISP signal.

22. A method as claimed in claim 20, wherein synchronizing the MSP signal to the ISP signal is performed when a first estimated position of the instrument determined as a function of the MSP signal independent of the ISP signal differs from a second estimated position of the instrument determined as a function of the ISP signal independent of the MSP signal.

23. A method as claimed in claim 22, wherein synchronizing the MSP signal to the ISP signal is performed when the first estimated position of the instrument differs from the second estimated position of the instrument by more than a threshold value.

24. A method as claimed in claim 22, wherein the threshold value is equal to the absolute value of a maximum historical difference between the first estimated position of the instrument and the second estimated position of the instrument.

25. A method as claimed in claim 23, wherein determining the position of the instrument as a function of the MSP signal and the ISP signal comprises: if the MSP signal is synchronized with the ISP signal, then determining the position of the instrument to be the first estimated position of the instrument, and otherwise determining the position of the instrument to be the second estimated position of the instrument.

26. A method as claimed in claim 25, wherein determining the position of the instrument as a function of the MSP signal and the ISP signal is more precise when the MSP signal is synchronized with the ISP signal.

27. A method as claimed in claim 25, wherein generating an MSP signal responsive to the position of the motor shaft comprises:
    (a) generating a directional motor shaft rotation signal responsive to rotation of the motor shaft through a predetermined angle about the motor shaft axis; and
    (b) counting the motor shaft rotation signals to produce the MSP signal.

28. A method as claimed in claim 27, wherein synchronizing the MSP signal comprises replacing the existing MSP signal with a synchronizing value.

29. A method as claimed in claim 28, wherein the synchronizing value is a function of the ISP signal.

30. A method as claimed in claim 29, wherein linking comprises creating mechanical advantage between the motor shaft and the clutch, the mechanical advantage being quantified by a mechanical advantage ratio.

31. A method as claimed in claim 30, wherein the function of the ISP signal is a product of a value represented by the ISP signal and the mechanical advantage ratio.

32. A method as claimed in claim 31, comprising presenting information about the position of the instrument on a user interface.

33. A method as claimed in claim 32, comprising applying torque to the motor shaft in response to a drive signal generated at least in cart on the basis of the determined angular position of the instrument.

34. A method as claimed in claim 33, wherein generating the drive signal comprises generating the drive signal in response to receiving information from the user interface and the determined angular position of the instrument.

35. A computer program embodied in a processor-readable medium for determining the position of an instrument mounted on an instrument shaft for rotation therewith, the instrument shaft being linked to a motor shaft adapted to receive torque from a motor wherein, in a first operating mode, the instrument shaft engages the motor shaft such that the instrument shaft and the instrument rotate upon the urging of torque received from the motor shaft and, in a second operating mode, the instrument shaft is disengaged from the motor shaft such that the instrument and the instrument shaft are rotatable independently of the motor shaft, comprising code segments that direct a processor to:
  (a) generate a motor shaft position signal ("MSP signal") responsive to an angular position of the motor shaft about a motor shaft axis;
  (b) generate an instrument shaft position signal ("ISP signal") responsive to an angular position of the instrument shaft about a instrument shaft axis; and
  (c) determine an angular position of the instrument as a function of the MSP signal and the ISP signal.

36. A computer program as claimed in claim 35, comprising code segments that direct a processor to synchronize the MSP signal to the ISP signal.

37. A computer program as claimed in claim 36, wherein the synchronization code segments direct a processor to synchronize the MSP signal to the ISP signal in response to the ISP signal.

38. A computer program as claimed in claim 36, wherein the synchronization code segments direct a processor to synchronize the MSP signal to the ISP signal when a first estimated position of the instrument determined as a function of the MSP signal independent of the ISP signal differs from a second estimated position of the instrument determined as a function of the ISP signal independent of the MSP signal.

39. A computer program as claimed in claim 38, wherein the synchronization code segments direct a processor to synchronize the MSP signal to the ISP signal when the first estimated position of the instrument differs from the second estimated position of the instrument by more than a threshold value.

40. A computer program as claimed in claim 38, wherein the threshold value is equal to the absolute value of a maximum historical difference between the first estimated position of the instrument and the second estimated position of the instrument.

41. A computer program as claimed in claim 39, wherein in the determining code segments, the function of the MSP signal and the ISP signal is defined as: if the MSP signal is synchronized with the ISP signal, then the result of the function is the first estimated position of the instrument, otherwise, the result of the function is the second estimated position of the instrument.

42. A computer program as claimed in claim 41, wherein the MSP signal generating code segments direct a processor to:
  (a) generate a directional motor shaft rotation signal responsive to rotation of the motor shaft through a predetermined angle about the motor shaft axis; and
  (b) tally the motor shaft rotation signals in a counter to produce the MSP signal.

43. A computer program as claimed in claim 42, wherein the synchronization code segments direct a processor to load a synchronizing value into the counter to replace the existing MSP signal.

44. A computer program as claimed in claim 43, wherein the synchronization value is a function of the ISP signal.

45. A computer program as claimed in claim 44, wherein the function of the ISP signal is a product of a value represented by the ISP signal and a mechanical advantage ratio between the motor shaft and the instrument shaft.

46. A computer program as claimed in claim 45, comprising code segments that direct a processor to present information about the position of the instrument on a user interface.

47. A computer program as claimed in claim 46, comprising code segments that direct a processor to generate a drive signal to command a motor to apply torque to the motor shaft in response to receiving information from the user interface and the determination of the position of the instrument as a function of the MSP signal and the ISP signal.

* * * * *